UNITED STATES PATENT OFFICE.

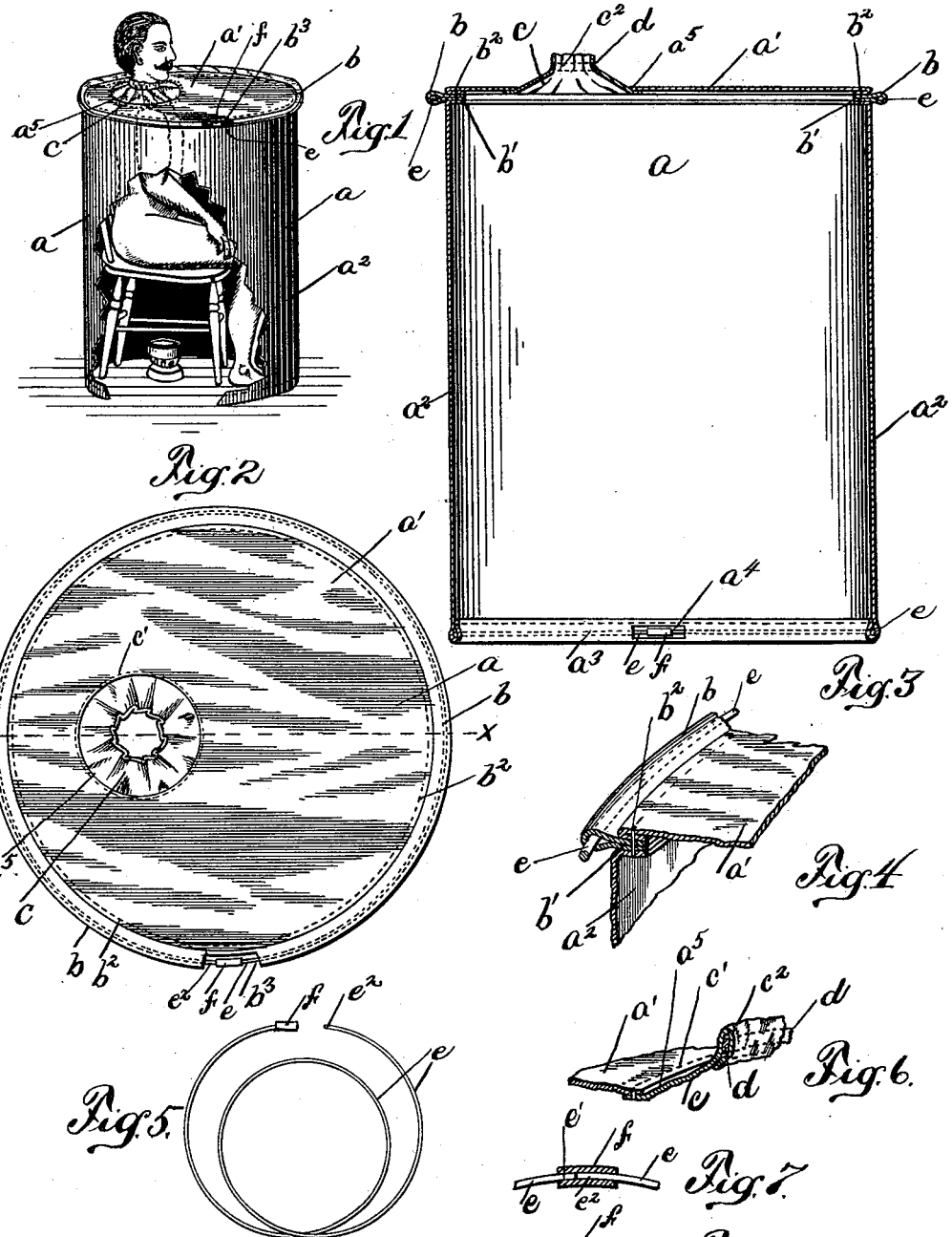

HENRY F. GRAY, OF COLUMBUS, OHIO, ASSIGNOR TO WILLIAM P. HARRISON, OF SAME PLACE.

BATH-CABINET.

SPECIFICATION forming part of Letters Patent No. 582,639, dated May 18, 1897.

Application filed April 24, 1896. Serial No. 588,989. (No model.)

*To all whom it may concern:*

Be it known that I, HENRY F. GRAY, a citizen of the United States, residing at Columbus, in the county of Franklin, State of Ohio, have invented a new and useful Bath-Cabinet, of which the following is a specification.

My invention relates to an improvement in hot-air or vapor bath cabinets; and the objects of my invention are to produce a cabinet of this class that will be light, cheap, and effective in operation, which may be folded in a compact form when not in use, and to produce other improvements which will be more specifically pointed out hereinafter. These objects I accomplish in the following manner, illustrated in the accompanying drawings, in which—

Figure 1 is a view in perspective showing the cabinet in operation. Fig. 2 is an enlarged plan view of my device. Fig. 3 is a central vertical section taken on line X X of Fig. 2. Fig. 4 is an enlarged detail view of the upper portion of cabinet, showing casing for frame-ring. Fig. 5 is a view of one of the frame-rings partly coiled for folding. Fig. 6 is a detail view of a portion of the neck-opening. Fig. 7 is a detail view showing the two ends of the frame-ring united in the socket, and Fig. 8 is a detail view showing the loose end of frame-ring withdrawn from socket.

Similar letters refer to similar parts throughout the several views.

As shown in Fig. 1 of the drawings, the cabinet $a$ is of a cylindrical form, the upper end $a'$ being closed and adapted to be supported on the shoulders of the bather.

The top $a'$ and side walls $a^2$ of the cabinet are preferably formed of air-tight or water-proof material, such as oil-cloth or similar substance. Around the periphery of the top $a'$ and at the upper edge of the side walls $a^2$ I form a circumferential fold or casing $b$. The inner edge $b'$ of said casing, as shown in Fig. 4 of the drawings, is inserted between the side walls $a^2$ and the top $a'$ of the cabinet, and is held in position by row of stitching $b^2$. Located in the periphery of the casing $b$ is an elongated opening $b^3$.

By making the casing $b$ separate from the top and body of the cabinet and providing its exterior with an opening and securing its interior between them a cheap construction is secured, and an opening is provided through which the ring for holding the device distended may be inserted and removed without making an opening through the wall of the cabinet through which the heat would escape, and the opening may be made large enough to permit of the joining and separating the ends of the ring more readily, and in case the insertion or removal of the ring should tear the casing it could be replaced without requiring an entire top and body, as would be necessary if it were formed integral with the top or body.

The lower edge of the cabinet $a$ is turned up and stitched, forming a hem or casing $a^3$ around the bottom of the cabinet $a$. The casing $a^3$ is provided with an opening $a^4$ on its inner side.

To one side of the center in the top $a'$ of the cabinet $a$ is located a circular opening $a^5$, which is partly closed by a collar or ruffle $c$. The outer edge of the collar $c$ is sewed at $c'$ to the edge of the opening $a^5$ in the top $a'$. The inner portion of the collar $c$ is provided with a casing $c^2$, which surrounds an elastic band $d$. Said band $d$ being smaller in circumference than the casing $c^2$ causes the collar $c$, which is preferably of a soft material, such as flannel, to be gathered closely around the bather's neck.

As my invention is intended to be supported entirely from the neck and shoulders without the use of stays to rest upon the shoulders, it is desirable that the collar or ruffle $c$ be made of a softer material than the top of the cabinet, so as not to chafe the bare skin by contact with the stiff material used in the cabinet that would be necessary to render the cabinet durable and efficient.

As a means of support and to hold the cabinet $a$ in the desired cylindrical form when in use, I provide upper and lower frame-rings $e$, which are adapted to be passed through and surrounded by the casings $b$ and $a^3$. These frame-rings are provided at one end with a tubular socket $f$, which is permanently fastened at $e'$ to the frame-ring $e$. The remaining end of the frame-ring $e$ is adapted to fit loosely in the socket $f$, permitting it to be withdrawn from said socket when desired, as shown in Fig. 8 of the drawings.

The operation of my device is as follows: The end $e^2$ of the ring $e$ is withdrawn from the socket $f$ and is inserted into the casing $b$ through the opening $b^3$ therein. The frame-ring $e$ is passed through the casing $b$ until both ends meet at the opening $b^3$ and is connected by inserting the end $e^2$ of the frame-rings into the socket $f$, as shown in Fig. 2 of the drawings. This operation is repeated at the bottom of the cabinet $a$, the frame-ring $e$ being inserted into the casing $a^3$ through the opening $a^4$, as shown in Fig. 3. The bather seats himself on a chair or stool, putting the cabinet over his head, and passes his head through the opening in the collar $c$, which is held closely around his neck through the agency of the elastic band $d$ in the casing $c^2$ of the collar. The top $a'$ of the cabinet $a$ rests on the bather's shoulders, supporting the cabinet in an upright position. An alcohol-stove or other heating agent placed under the chair or stool is employed to supply the heat or vapor used for the bath. The air-tight quality of the material used in the top $a'$ and side walls $a^2$ of the cabinet and the close-fitting collar $c$ prevent the escape of the heat generated.

It will be readily seen that my device may be packed or folded into a small space by withdrawing the frame-rings $e$ from the casings and coiling them into a double coil, as shown in Fig. 5, the socket $f$ receiving the end $e^2$ of the frame-ring $e$ and retaining the ring in the coiled position shown. In this manner the diameters of the rings $e$ are reduced to one-half their size when in operation.

The cabinet $a$ being constructed of pliant or yielding material can be readily folded up in any desired form for packing or shipping.

Having now fully described my invention, what I claim, and desire to secure by Letters Patent, is—

In a bath-cabinet, the combination, with a body comprising a cylindrical portion, the bottom of which is formed into a casing provided with an opening upon its inner side, a circular top portion provided with an opening for the passage of the head, and an annular casing provided with an opening at its exterior portion and having its inner portion secured between the top of the cylindrical body and the edge of the circular top, of a collar of softer material than the body of the cabinet secured at its outer edge adjacent to the opening in the top and having its inner edge provided with a casing, a draw-string within the casing of the collar, and a separable removable ring within each of the casings at the top and bottom of the body, one end of each ring being provided with a socket permanently secured thereto and adapted to receive the opposite end of the ring, substantially as set forth.

HENRY F. GRAY.

Witnesses:
LINCOLN FRITTER,
HARRY P. JUNK.